UNITED STATES PATENT OFFICE.

THOMAS L. WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

FERTILIZING COMPOUND.

1,103,910.

Specification of Letters Patent. Patented July 14, 1914.

No Drawing. Application filed December 18, 1911. Serial No. 666,398.

*To all whom it may concern:*

Be it known that we, THOMAS LEOPOLD WILLSON and MAXIMILIAN MATTHEUS HAFF, both subjects of the King of Great Britain, and residents of the city of Ottawa, county of Carleton, Province of Ontario, Dominion of Canada, have invented new and useful Improvements in Fertilizing Compounds, and do hereby declare that the following is a full, clear, and exact description of the same, such as will enable others skilled in the art to which it appertains to make and use the same.

This invention relates to an improved process of obtaining a mixture of alkali compounds useful for fertilizing and the object of the invention is to obtain at a minimum cost, a mixture of alkali metal compounds possessing considerable utility as a fertilizer and for other purposes.

Potash is a well known fertilizer, but its use in many instances is disadvantageous in that its natural silicate compounds are of an insoluble character which permits it to be affected only slowly by water, natural agencies, etc. It has been proposed to mix it mechanically with other compounds, such as soluble chlorids, sulfates, etc., but such mixtures leave the resultant product open to the same objection.

The present invention provides a process which will produce the potash in such association with another less soluble compound that it will remain a considerably shorter time in position on the ground to be fertilized. In addition the method effects an economy in production for the reason that instead of separately recovering the ingredients of the fertilizers from their respective minerals, they are recovered together in convenient form for use.

A further feature of the invention relates to the separation of the undesirable original constituents from the compound resulting from the process.

According to the present invention ores or minerals containing potash and calcium phosphate are heated together to fusion when they will combine and may be slagged off from the remainder of the unaffected mixture. The molten mass after cooling may be ground to an impalpable powder and used as a fertilizer. To free the potash and phosphoric acid in this powder from such other constituents as are undesirable, the powder is suspended in water and sulfur dioxid passed therethrough which dissolves the potash and phosphoric acid, which latter may be recovered by evaporating to dryness.

While this invention is useful particularly for the manufacture of a fertilizer, as above stated, its use is not limited thereto; in fact, the process might be applied to a variety of other minerals with corresponding differences in the products produced. Generally it may be said that if a mineral containing an alkali, such as lithium (Li), sodium (Na), potassium (K), rubidium (Rb) cæsium (Cs), is heated to fusion with a compound of an alkaline earth, such as any alkaline phosphate, or with any phosphate or a chlorid or sulfate which may even contain soluble potash compounds a fused mass will result which may be drawn off and will be found to contain the acid of the alkaline earth and the alkali in intimate association. As to whether this association is wholly chemical or physical it has not yet been determined.

As a practical example of the process as applied to the manufacture of a fertilizer, we would refer to the use of feldspar (orthoclase) and apatite or phosphorite (calcium phosphate.) If these two are placed together and heated to fusion (which takes place at a temperature of about 1000 degrees C.) the molten mass may be drawn or tapped off and will be found to contain lime, silica, alumina, potash and phosphoric acid or chlorids or sulfates according to the original mixture, which possesses considerable fertilizing properties. The product when cool is similar in physical structure to china or porcelain, and for use as a fertilizer it is ground to an impalpable powder.

To facilitate the operation other compounds or fluxes such as fluorids, natural borates or iron oxids, and generally any compound which will promote ultimate disintegration of the complex compound may be introduced.

The proportion of the feldspar and apatite may be regulated to suit the amount of potash or phosphate desired in the resultant product.

As an alternative to the above, carnallite or kainite (potassium magnesium compounds) may be heated to fusion with feldspar or calcium phosphate and the product separated as already pointed out. As another alternative superphosphate of lime might be used instead of calcium phosphate.

Considering now the treatment of the powdered product. Any vapors which are collected from the furnace will generally be found to consist of phosphoric acid and potash, and if these vapors are led into a mass of the dried powdered product such product will absorb them and will be enriched thereby. It will also be possible to enrich the product with vapors of other fertilizers such as nitrogen compounds. A still further feature of the invention relates to the treatment of this product with gases, liquids, acids or any compound whatsoever to effect the immediate solution of the potash and phosphoric acid. This would have the result of separating the potash and phosphoric acid from other elements of the mineral, such as alumina, and silica, which may be undesirable in the fertilizer, leaving it free to use them in the liquid or when dried therefrom. Thus the powder produced as herein set forth might be treated with aqueous chlorin, aqueous sulfur dioxid, or dilute hydrochloric acid or bisulfite liquor to form a solution of the potash and phosphoric acid which potash and phosphoric acid might be separated together by drying.

The most convenient method of carrying out the process is to place the powder in suspension in water and bubbling sulfur dioxid therethrough.

It may be stated that the process is carried out without any reducing action and it will be found desirable to prevent the entrance of any reducing substances as far as possible, excepting in the case of the formation of suboxids as fluxes.

Though we have described with great particularity of detail certain specific processes embodying the invention yet it is not to be understood therefrom that the invention is limited to the exact processes described. Various modifications thereof may be made by those skilled in the art without departure from the invention. It will be understood, however, that the term "alkali metal" in the following claims is not to be construed as including the hypothetical metallic base ammonium.

It may be stated that the term "compound" as used herein is not limited to a chemical compound but may include a physical union of the elements referred to.

As many changes in the above could be made and many apparently widely different embodiments of the invention within the scope of the claims constructed without departing from the spirit or the scope thereof, it is intended that all matter contained in the accompanying specification shall be interpreted as illustrative and not in a limiting sense.

What we claim as our invention is:

1. A fertilizer comprising a powder formed from a fused mass containing an alkali metal and a phosphate enriched with potash vapor.

2. A fertilizer comprising a powder formed from a fused mass containing an alkali and a phosphate enriched with vapor of potash and phosphoric acid.

3. A fertilizer comprising a powder formed from a fused mass containing an alkali and a phosphate enriched with vapors of potash, phosphoric acid and ammonia.

In witness whereof we have hereunto set our hands in the presence of two witnesses.

THOMAS L. WILLSON.
MAXIMILIAN MATTHEUS HAFF.

Witnesses:
RUSSEL S. SMART,
D. C. A. RAYE.